US006917370B2

(12) United States Patent
Benton (10) Patent No.: US 6,917,370 B2
(45) Date of Patent: Jul. 12, 2005

(54) INTERACTING AUGMENTED REALITY AND VIRTUAL REALITY

(76) Inventor: Charles Benton, 372 Boothbay Rd., Edgecomb, ME (US) 04556

( * ) Notice: Subject to any disclaimer, the term of this patent is extended or adjusted under 35 U.S.C. 154(b) by 266 days.

(21) Appl. No.: 10/144,467

(22) Filed: May 13, 2002

(65) Prior Publication Data
US 2003/0210832 A1 Nov. 13, 2003

(51) Int. Cl.[7] .............................................. G09G 5/00
(52) U.S. Cl. ........................ 345/633; 345/204; 345/629; 345/632
(58) Field of Search ..................... 345/8, 204, 629–633, 345/7, 419; 340/705

(56) References Cited

U.S. PATENT DOCUMENTS

| 5,153,569 | A | * | 10/1992 | Kawamura et al. ............ 345/8 |
| 5,491,510 | A | | 2/1996 | Gove |
| 5,566,073 | A | | 10/1996 | Margolin |
| 5,742,521 | A | * | 4/1998 | Ellenby et al. |
| 5,786,849 | A | | 7/1998 | Lynde |
| 5,987,363 | A | | 11/1999 | Quan et al. |
| 6,037,914 | A | * | 3/2000 | Robinson |
| 6,084,557 | A | | 7/2000 | Ishida et al. |
| 6,157,876 | A | * | 12/2000 | Tarleton, Jr. et al. |
| 6,175,343 | B1 | * | 1/2001 | Mitchell et al. |
| 6,181,302 | B1 | | 1/2001 | Lynde |
| 6,208,349 | B1 | | 3/2001 | Davidson et al. |
| 6,208,933 | B1 | * | 3/2001 | Lazar |
| 6,222,583 | B1 | * | 4/2001 | Matsumura et al. |
| 6,241,609 | B1 | * | 6/2001 | Rutgers |
| 6,249,241 | B1 | | 6/2001 | Jordan et al. |
| 6,346,938 | B1 | | 2/2002 | Chan et al. |
| 6,411,266 | B1 | * | 6/2002 | Maguire, Jr. ................... 345/8 |

OTHER PUBLICATIONS

"Augmented Reality: A new way of seeing", Steven K. Feiner, Scientific America Apr. 2002.

* cited by examiner

Primary Examiner—Sumati Lefkowitz
Assistant Examiner—Srilakshmi K Kumar
(74) Attorney, Agent, or Firm—Shalom Wertsberger; Saltamar Innovations (57) ABSTRACT

A combination of interacting virtual reality (VR) and augmented reality (AR) system is provided where the system automatically switches from VR to AR when the user selected viewpoint coincides, within tolerance, with the observable AR viewpoint. The invention discloses an apparatus adapted to provide easy access and automatic switching between AR and VR, and method thehrefor.

38 Claims, 7 Drawing Sheets

INTERACTING AUGMENTED REALITY AND VIRTUAL REALITY

FIELD OF THE INVENTION

The invention relates generally to computer modeled reality and more particularly to a system and method for augmented reality and virtual reality interaction.

BACKGROUND OF THE INVENTION

Virtual reality (also referred to as VR) and augmented reality (also referred to as AR) systems are well known in the art. In virtual reality, an entire environment is generated by a computer, and is immersive in nature. Subject to system design considerations, the user can move freely around the environment, which may or may not reflect real world environment. The environment may reflect a model of reality, reflect a fictitious environment, or comprise a combination of the two. A common benefit of VR is that the user can view an environment from perspectives not normally possible in the real world. For example, a user can 'fly' above an area to get a bird's eye view.

Augmented reality combines the "real world" reality with a virtual one. The "real world" reality is the actual observable scene, one perceived by a viewer (e.g. a human eye, an optical or electronic sensor, and the like). The observable scene is determined by the viewer location, direction of view and limitations of the viewer (e.g. darkness) or the actual environment (such as fog, smoke, vegetation, and the like). In augmented reality (also referred to as AR), computer generated images are combined with an actual or a representation of the observable scene.

In both AR and VR, a viewpoint determines the viewable scene. The viewpoint is determined by the viewer coordinates, the direction of view, and the horizontal and vertical field of view. In VR systems the viewpoint is commonly defined by the user, while in AR systems, the viewpoint is determined by the observer, or viewer viewpoint, i.e. the x, y and z, coordinates and the heading, pitch and roll. In both AR and VR systems a computer renders the environment based on an environment model that may contain information required to render the computer generated graphics. Such rendition may be a photo-realistic rendition of objects, a cartographical rendition, navigational data, and the like. In some cases, the most effective rendition comprises icons, textual data, pointers, and the like.

Computerized environment models often comprise a combination of computer generated graphics with actual photographic data. Depending on the purpose of the system dynamic objects may be added by information provided by sensors like radar, sonar, magnetic, heat and other sensors that reflect a dynamically changing reality.

In VR systems the user selected viewpoint determines a portion of the computerized environment model that is rendered and presented to the user. In AR systems, the viewer may be an image sensor such as a camera, a human eye, an optical sensor such as a periscope, and the like. At a given point in time, the viewer has a viewpoint, which determine the observable scene. Commonly in an AR system, an orientation sensor is provided to sense the direction of view, and in most mobile systems, a location sensor is also required, to correlate the augmented portion of the view with the observable scene. The output of the location and orientation sensors dictates the viewpoint. The AR system generates a rendered addition, also known as an overlay, which is a rendition of a portion of the computerized environment model, defined by the viewpoint. The overlay is merged with the observable scene image, in close registration thereto, to augment the visual information supplied to the user.

An example of augmented reality system is presented in U.S. Pat. No. 6,208,933 to Lazar, directed to overlaying cartographic data on sensor based video. In this system cartographic data from a storage device is superimposed on data received from a video sensor. A location sensor is utilized to correlate the video image and the cartographic image.

VR systems are often used in simulations where a 'global' view is required, or for immersive situations such as game playing, training, and the like. VR systems are often used for navigation and educational purposes. An example of educational AR system is described in U.S. Pat. No. 6,175,343 to Mitchell et al. directed to a system that allows article viewing while overlaying informational or historic data overlay, to enhance the exhibit experience. A good example of navigational AR system may be found in U.S. Pat. No. 6,181,302 to Lynde, which discloses a marine navigation binoculars with virtual display superimposing real world image. The Lynde device uses orientation and positioning sensors, and overlays navigational and other data from several sources on the real world image.

AR and VR systems both utilize displays to display the computer rendered graphics. AR systems are divided to video-through and see-through displays. In see-through displays, the user sees actual light reflected from the observable scene, and the computer generated graphics are merged by optical combiners. Optical combiners commonly comprise a beam splitter inserted in the field of view of the user. However newer methods of displays include reflecting the computer data directly onto the user retina, or projecting the data in front of the user. In video through display a camera captures the observable scene and the computer generated graphics are merged with the video data. In VR systems the observable scene is not desirable, as it will confuse the view. Displays may be static such as a television or LCD, or portable, such as a heads up display, head mounted displays, handheld displays and the like.

VR systems sometimes relate the rendering directly to the observable viewpoint, but provide an image that is wholly computer generated. An example of such system is provided in U.S. Pat. No. 5,566,073 to Margolin. In this system the viewpoint is determined by the location and orientation of an airplane and a three dimensional (3D) view of the terrain is displayed in the cockpit, regardless of the visibility conditions.

Since the viewpoint of an AR system depends on the observed viewpoint that is directly related to the viewer location, certain parts of the AR data are sometimes difficult to distinguish due to cluttering. If the model dictates that many objects should be rendered those objects may overlap in a narrow field of interest, such as the horizon. VR systems allow viewing from different angles to decrease the confusion, and thus may provide a better understanding of the environment, however a view of reality captured by a human eye is often required beside computer generated graphics.

There is therefore a clear need for and a significant advantage provided by the seamless integration of AR and VR systems

SUMMARY OF THE INVENTION

It is therefore an object of the present invention to provide an AR and VR integration, and to overcome the limitation of present systems. A basic concept of the invention is switching between the VR and AR system responsive to selection of the viewpoint. Thus the invention provides for a visual information display apparatus, adapted to operate in conjunction with a computer to perform the graphic generation, and any convenient display device. The apparatus comprises a model engine adapted to display a representation of a computerized environment model, or a portion thereof, from a plurality of user selected viewpoints. The model may contain any type of data, for example rendered graphics, to pre-recorded graphics, cartographic data, navigational data, combinations of the above or any other desirable data. Preferably the model is also adapted to display dynamic objects such as those reflecting radar and sonar data, heat sensors and magnetic sensor data, and any other data reflecting the actual environment from any desired source. The model engine is constructed to create a representation of the model data suitable for visual display, which may comprise text or graphical image, or a combination thereof. The representation of model data is fed to an image integrator adapted to automatically merge a representation of the portion of the model with an observed scene input viewed from an observed scene viewpoint, when the user selected viewpoint is within a predetermined proximity to the observed scene viewpoint, thus creating an augmented scene. The preferred embodiment offers therefore a seamless integration between the VR portion and the AR portion where the scene is transformed to an AR scene when the user selects a viewpoint that is sufficiently close to the actual viewer viewpoint.

Preferably, the apparatus also comprises a viewpoint selector such as a mouse, a trackball, a keyboard, a joystick or any other input device. The viewpoint selector allows the user to select a viewpoint. In certain systems, the viewpoint selection may be automatically selected for the user, or the viewpoint may be selected in steps. However the preferred embodiment calls for a continuous smooth modification of the viewpoint.

In a more preferred embodiment therefore, the invention comprises a display, a computer coupled to the display, and operable to generate thereupon a representation of a computerized environment model or a portion thereof responsive to user selected viewpoint. An image sensor adapted to generate an observed scene image from a scene viewpoint determined by the location and orientation of said image sensor is selectively coupled to the display. A viewpoint comparator is adapted to compare the user selected viewpoint and the scene viewpoint, and to issue a switch signal when said scene viewpoint coincides within predetermined proximity with said user selectable viewpoint. An image integrator is adapted to selectively merge at least a portion of said environment model with the observed scene image responsive to said switch signal.

An aspect of the invention is also a method for automatic switching between virtual reality and augmented reality, the method comprising the steps of displaying a representation of a computerized environment model or a portion thereof on a display device, thus the system can be said to operate in VR mode. Selecting a user selectable viewpoint, and modifying the representation in accordance with the user selectable viewpoint, which is preferably entered by a viewpoint selector. The method provides for sensing the observable scene viewpoint, comparing said user selectable viewpoint and observable viewpoint, and merging at least a portion of the environment model with the observable scene if the user selectable viewpoint and the observable scene viewpoint are within a predetermined proximity to each other. By the step of merging, the system operates essentially in AR mode.

Preferably, the method further comprises the step of blocking the observable scene when the observable and selected viewpoints are further from each other more than a predetermined distance, i.e. when operating in VR mode. The lack of registration between the VR data and the observable scene is a natural result of the different viewpoint, thus merging the VR data with the observable scene is not desirable.

According to a preferred embodiment of the invention, there is provided a visual information display apparatus adapted to operate in conjunction with a computer and a display device, said apparatus having an environment model for providing information about an environment; a selector means for selecting a selected viewpoint; an image generator means for generating a computerized image from said environment model responsive to said selected viewpoint, and an visual input means for receiving an observed image, said visual input means having a viewpoint. The apparatus characterized by a controllable merging means, for selectively merging said observed image with said computerized image, and by a viewpoint comparator means for comparing said selected viewpoint with said observed viewpoint, and controlling said merging means responsive to the relationship between said viewpoints

SHORT DESCRIPTION OF DRAWINGS

Different aspects of the invention would be better understood in light of the accompanied drawings in which.

DETAILED DESCRIPTION

Figure 1:
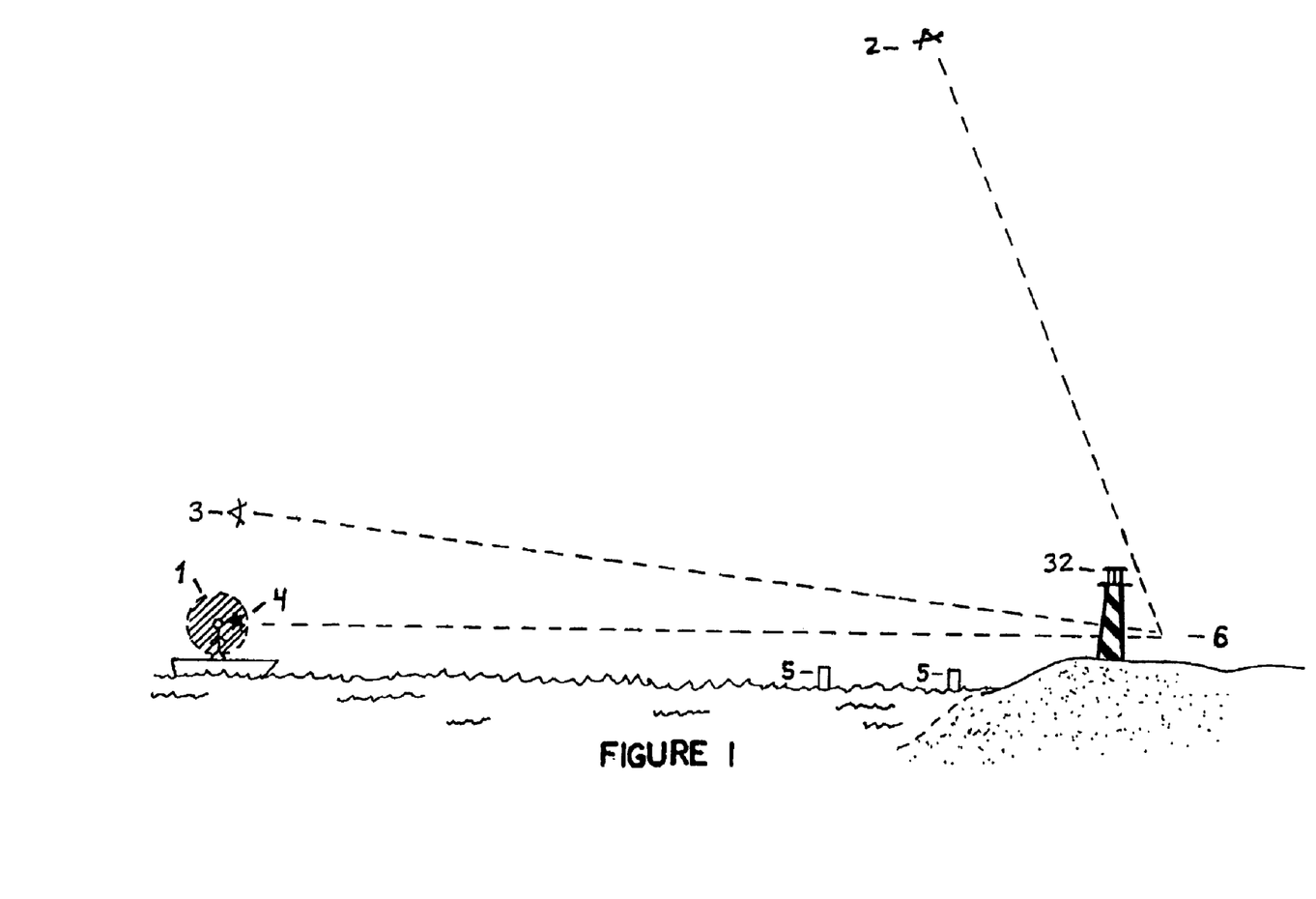
FIG. 1 depicts a scene showing a scene and several viewpoints.

For simplicity the following description will relate to a preferred embodiment of a navigational aid system positioned on a ship approaching a harbor. Referring now to FIG. 1, a cross section of an environment is shown, where a real world environment comprising navigational aids 5 and the shore 6 are viewed. Viewpoint 2, represents an almost bird's eye view from the top. Viewpoint 3 provides an oblique view, from a point above the ship. Both viewpoints 2 and 3 reflect different views in VR mode. Viewpoint 4 is the observed viewpoint, i.e. the viewpoint dictated by the viewer location and orientation.

It should again be noted that the viewer in this case relates to any manner of viewing the observable scene. The observable scene may be observed by a person, a camera, or an optical device such as a periscope, binoculars, monocular, head-up display, portable or handheld display, head mounted display projected display or any other convenient display that allows for registration of the model representation when operating in AR mode. Such viewer may also comprise a light amplifier, filters of different kinds such as infra red or polarizing filters, and the like. In case the viewer is a camera, optical device, or sensor, the actual observer/user may be remote to the viewer.

Figure 2:
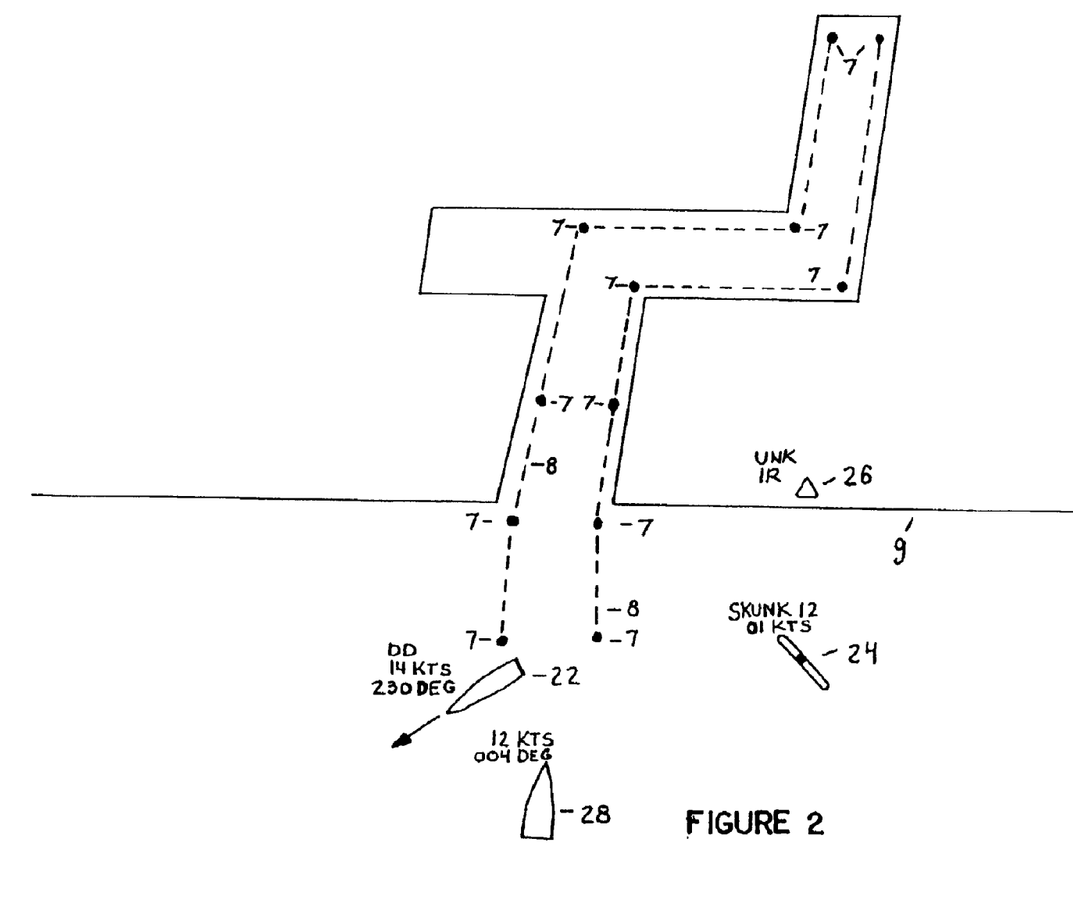
FIG. 2 depicts a top VR view from a first viewpoint in FIG. 1.

FIG. 2 is an example of a VR, computer generated scene as viewed from viewpoint 2. It shows an almost top view of the environment. The preferred embodiment allows the user to select object types of interest for display, thus the view shows a cartographic depiction of the terrain, and an entry channel into the port. The channel boundaries are shown in dashed lines 8. The shoreline 9 is shown in solid lines. Navigational markers 7 are also shown. The user or the computer may dictate different aspects of the view. By way of example the user may enter a minimum desired ship draft, and the computer may select an appropriate channel.

FIG. 2 also depicts several dynamic objects. The object marked DD is a radar target and the arrow emanating therefrom 22 depicts the speed and heading of such target. Object 24 depicts an unknown submarine detected by sonar contact. Object 26 is an unknown heat source detected by an infra red sensor near the shoreline. The ship own location 28, speed and heading are also depicted. It will be clear to those skilled in the art that such data about dynamic objects may be entered from several sources, such as a tactical information system, a large variety of sensors, or even manually. Views such as FIG. 2 provide the ship crew with an overview of the conditions ahead.

Figure 3:
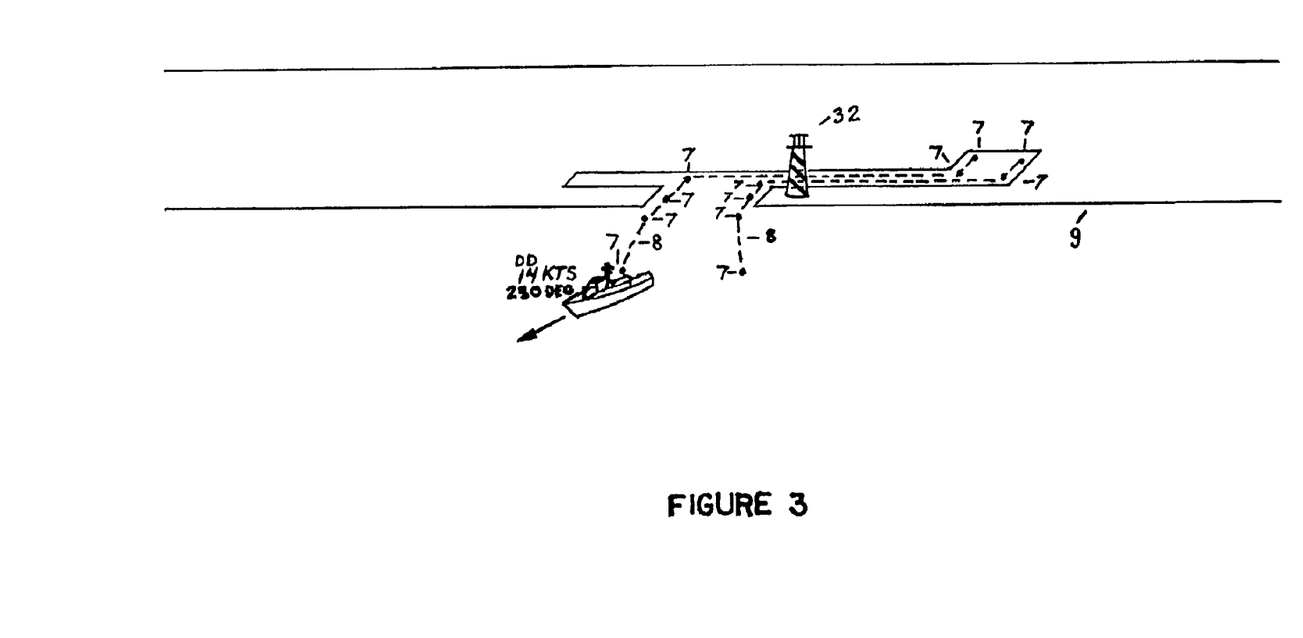
FIG. 3 depicts an oblique VR view from a second point of FIG. 1.

FIG. 3 shows the view from a viewpoint close to the actual observable scene. The channel is again depicted by dashed lines 8 and the shoreline by solid lines 9, but the computer in this case shows other features that reflect a more visual representation of the model. By way of example, the computer places a view of a lighthouse 32 which should be visible to the ship personnel. The depiction of the lighthouse is photo realistic, and may be generated by the computer or comprise a previously taken picture. The radar target DD is also shown by an image of a ship, and the image reflects the detected relative orientation of the ship, derived from its radar detected heading.

Preferably, the display is also capable of obscuring the observable scene when in VR mode, as shown in FIGS. 2 and 3. Otherwise the scene may become confused by the superimposition of non-related objects. In video through systems, the signal from the observable scene is easily blocked. However even in see through systems blocking is possible, for example by placing an opaque object between the observer/user and the observed scene. Such object may for example be a shutter or a computer controlled Liquid Crystal Display (LCD) device that can be turned opaque electrically when desired.

Figure 4:
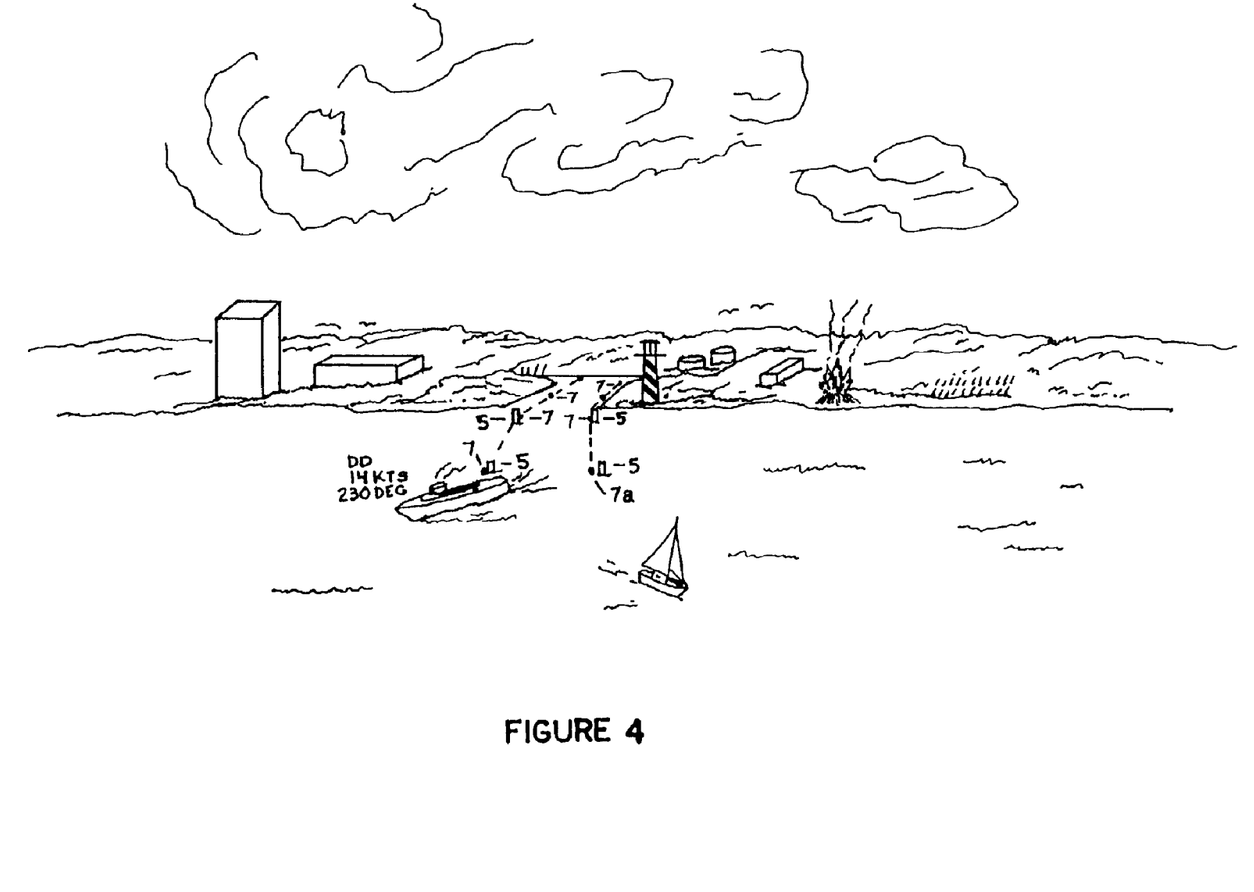
FIG. 4 depicts an AR view of the FIG. 1 scene.

FIG. 4 depicts an AR view. Most of the shown scene is derived directly from a camera mounted outside the ship. Clearly, far more details are available. The computer however provides some data superimposed on the observed scene. The target DD is identified by superimposing computer generated text. While the channel is still marked, it is harder to discern the pattern it follows after the first few markers 7. However the computer generated marker 7a indicates the location of the actual navigational aid 5. Another example for the advantage provided by using the AR system is the capture of dynamic objects that are not detected by the system, such as the sailboat depicted in the drawing.

In the preferred embodiment the user may select the desired viewpoint; and modify that viewpoint continuously. An area called the AR zone 1 (depicted in FIG. 1) is predetermined either at system design time, or in the field, e.g. by the user or a technician. When the selected viewpoint falls within the AR zone the computer automatically switches to AR view, thus allowing the user to discern far more details of the actual observed scene. A certain level of tolerance is applied to the zone in order to prevent frequent switching when the viewpoint is on the boundary of the AR zone.

Figure 5:
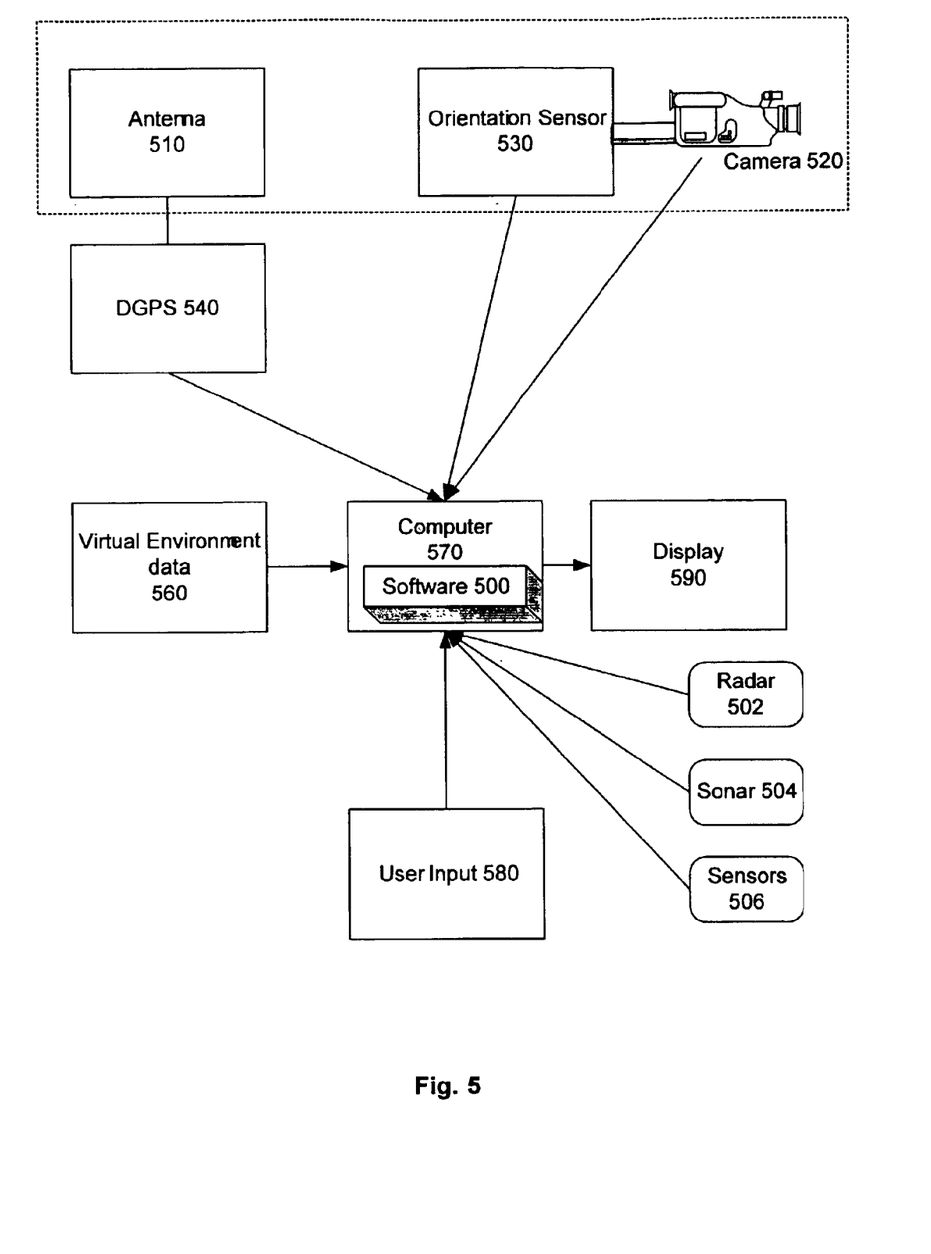
FIG. 5 is a simplified block diagram of the preferred embodiment of the invention.

FIG. 5 depicts a simplified diagram of a preferred embodiment operating in accordance with the present invention. An antenna 510 feeds location information to a GPS system 540, preferably operating in differential GPS mode. The GPS provides location information to a computer 570. The computer is also receiving information from an orientation sensor 530 coupled to a video camera 520. The video camera 520 outputs a video signal. The computer runs software 500 that comprises virtual reality and augmented reality systems. A virtual environment data 560 is available to the computer as needed. A user input module comprises a viewpoint selector 580 that allows the user to manipulate and select viewpoints. Preferably the user input further comprises selection of other parameters such as the types of data to be displayed. The output of the computer, selectively including the camera video signal, is fed to a display 590. The computer may also be fed radar, sonar and sensor data to integrate dynamic objects into the environment model.

Figure 6:
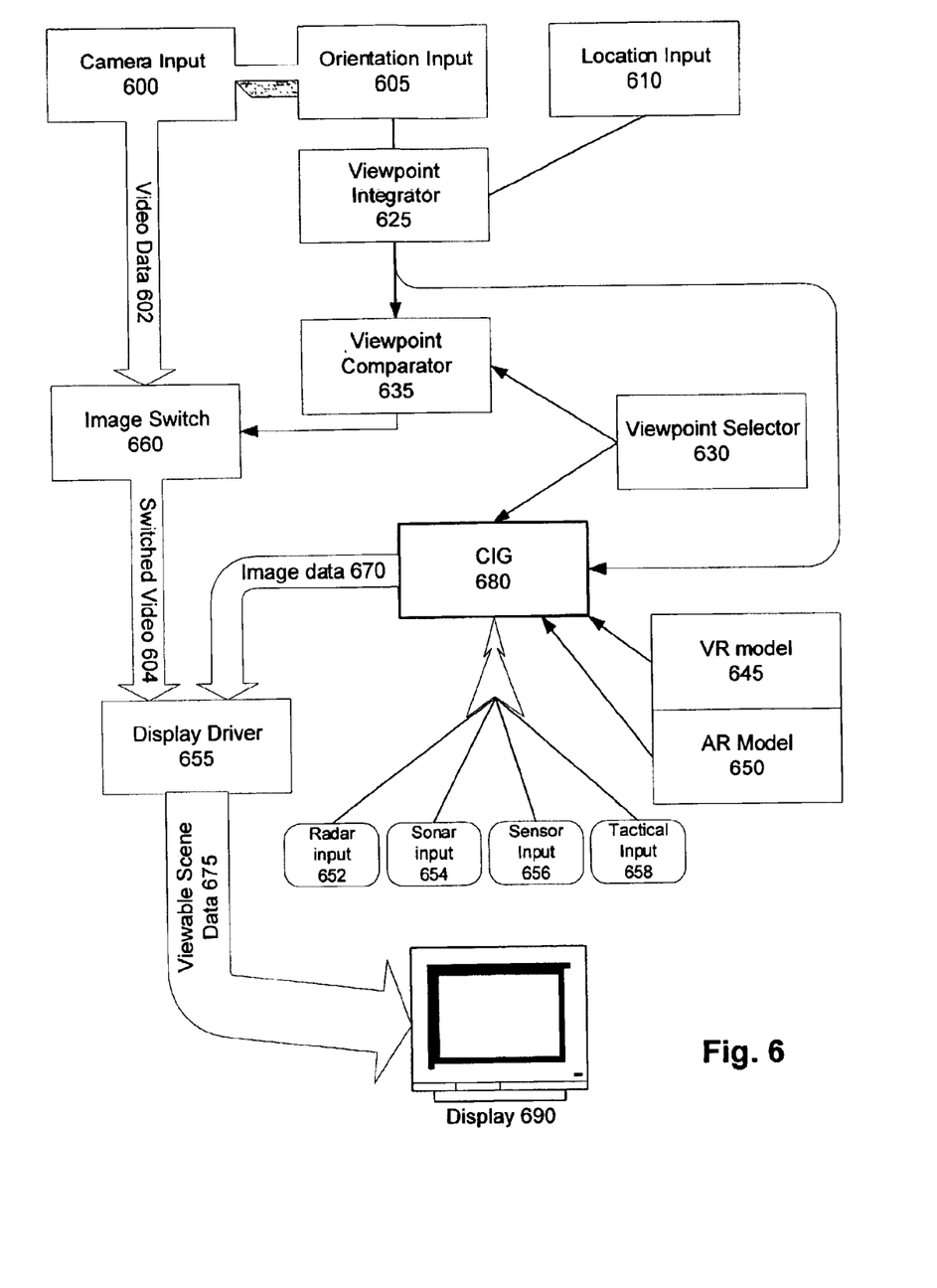
FIG. 6 is a simplified block diagram of software and hardware of the preferred embodiment.

FIG. 6 represent a simplified block diagram of software and hardware components of the preferred embodiment. . A Computerized Image Generator (CIG) 680 utilizes a VR model 645 and AR model 650 to derive image data 670 and feed it to display driver 655, which preferably operate as an image integrator. While the VR and AR models may be combined in a single model, the portions of the model viewed from the observable viewpoint may be considered a separate model, and in the preferred embodiment, the user can select different types of data for display, while ignoring other data. The CIG 680 is also fed information from radar 652, sonar 654 tactical systems 658 or any desired sensor data 656 such as IR sensors. The CIG receives information from viewpoint selector 630, and preferably also from the viewpoint integrator 625. Viewpoint integrator 625 combines data from a location sensor 610 such as a GPS, and from an orientation sensor 605 coupled to the camera. Viewpoint comparator 635 compares the user selected viewpoint with the observable viewpoint from the viewpoint integrator 625, and issues a switching signal to image switch 660. Image switch 660 receive video data 602 from camera input 600 and switches it to display drivers 655 responsive to the switching signal. The display drivers integrate the image data 670 and the switched video 604 into viewable scene data 675 that is then displayed on display 690.

Figure 7:
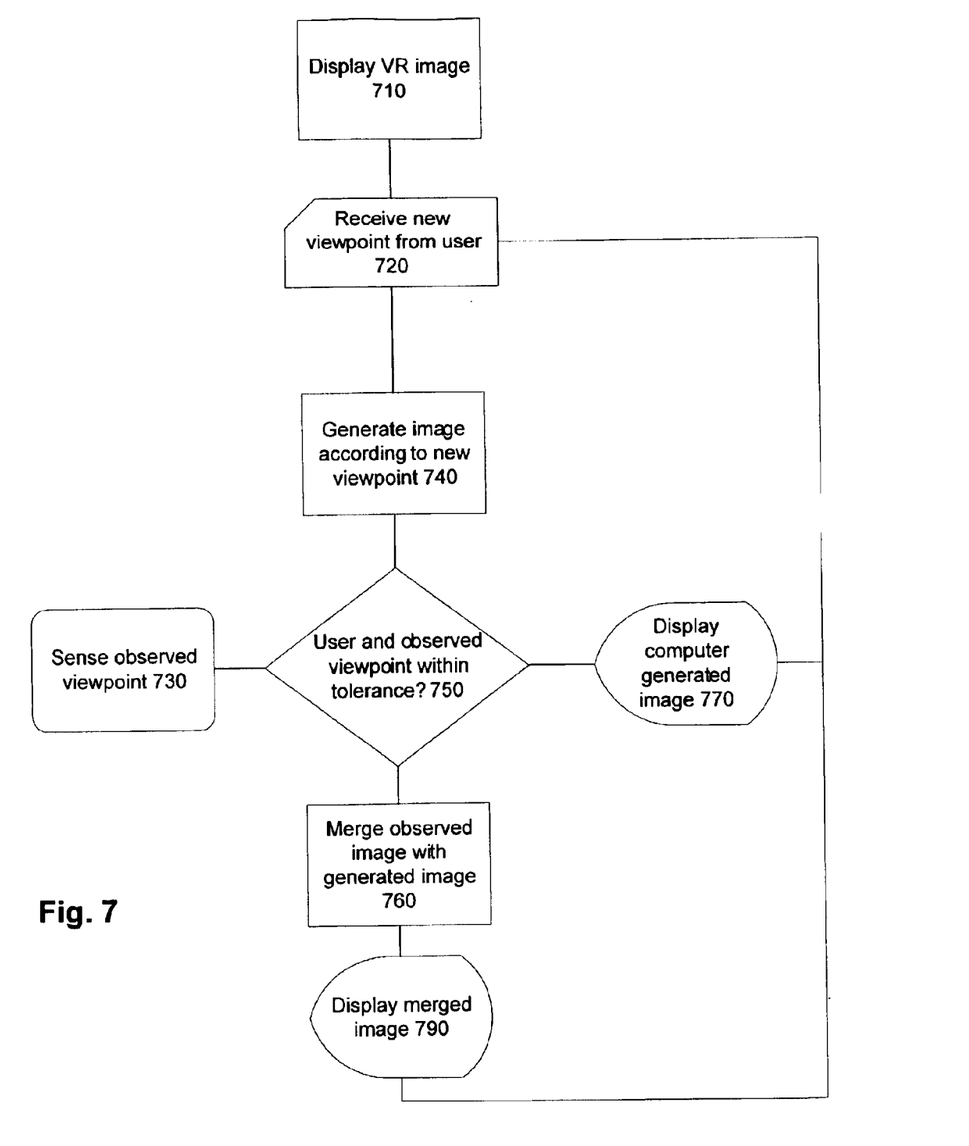
FIG. 7 depicts a flow diagram in accordance with a preferred method in accordance with the invention.

FIG. 7 depicts a simplified flow diagram of the process carried on during system operation. The system displays a VR image 710. When the user enters a new viewpoint 720, the CIG generates a new image 720 according to the new viewpoint. The system senses the observable viewpoint 730 and compares the it with the user selected viewpoint 750 If the viewpoints fall within a certain tolerance from each other, the system merges the observed image with the image generated in step 720, and displays the merged image. Preferably certain aspects of the model are removed prior to the display, to reduce clutter. Also preferably, the system moves the viewpoint to the observable viewpoint, to prevent frequent switching between AR and VR mode that would have happen if the viewpoint stayed on the limits of the AR zone 1. Additionally, such movement of the viewpoint to the center of the AR zone aids and simplifies registration of the observable and generated images.

An environment model is a collection of data that represents the desired environment. Such model may comprise fictional objects and geographical data as well as representation of real world objects and geographical data. Preferably the data is organized in a database. The data is such that a computer may utilize it to generate a displayable image, preferably in a graphic image, combined with text as desired mode, so as not to obscure the observable scene.

It will be clear to those skilled in the art that the functionality of the system as a whole may be distributed differently from the example provided herein, and that those elements are defined primarily in terms of their overhaul functionality and not in terms of being constructed as separate modules, or following any specific programming model. Thus, by way of example, the steps of merging dynamic data may be performed by the image generator, the image engine may function also to integrate the viewable scene, or to generate the image and the like. Many different orders of execution may also be practiced, which is but one of many modifications that achieve substantially equivalent results in system operation. Similarly, the orientation and location sensors may be of different types than those described. Thus for example, the location sensor may be a DGPS, radio triangulation type, or in the case of a stationary system, a dynamic location sensor may be eliminated altogether and replaced by a static sensor, i.e. by fixed data entered into the system. Different display methods may be employed, and the like. The selection of such construction is a matter of technical choice and does not depart from the invention.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein, in light of the disclosure provided hereinabove and the state of the art, without departing from the spirit or scope of this invention and that it is, therefore, aimed to cover all such changes and modifications and equivalents as fall within the true spirit and scope of the invention, for which letters patent is applied.

What is claimed is:

1. A visual information display apparatus for displaying virtual reality and augmented reality scenes, the apparatus comprising:
    a display;
    a computer coupled to said display, and operable to generate thereupon a representation of a computerized environment model or a portion thereof responsive to user selected viewpoint;
    an image sensor adapted to generate an actual observed scene image from a scene viewpoint determined by the location and orientation of said image sensor;
    a viewpoint comparator adapted to compare the user selected virtual viewpoint and the observed scene viewpoint, and to issue a switch signal when said observed scene viewpoint coincide within predetermined proximity with said user selectable virtual viewpoint; and,
    an image integrator adapted to selectively merge at least a portion of said environment model with the observed scene image;
    wherein said computer is adapted to switch between displaying a virtual reality scene and an augmented reality scene, in response to said switch signal.

2. The visual information display apparatus of claim 1, further comprising a viewpoint selector operable to vary said user selected virtual, viewpoint continuously.

3. The visual information display apparatus of claim 1, further comprising an orientation sensor and a location sensor coupled to said image sensor;
    and a wherein said observed scene viewpoint is determined by outputs of said location and orientation sensors.

4. The visual information display apparatus of claim 1, wherein said image sensor comprises a camera.

5. The visual information display apparatus of claim 1, wherein the display is selected from a group consisting of a head mounted display, a television display, a computer display, a handheld display, a virtual display, a heads up display, an optical combiner display, a stereoscopic display, a monocular display, a binocular display, a selectively opaque display mounted in the user field of view, a retinal illumination display, projective display, or a combination hereof.

6. The visual information display apparatus of claim 1 wherein said computerized environment model comprises cartographic data.

7. The visual information display apparatus of claim 1 wherein said computerized environment model comprises navigational data.

8. The visual information display apparatus of claim 1 wherein said computerized data environment model comprises pre-captured image data, or computer generated image data, or a combination thereof.

9. The visual information display apparatus of claim 1 wherein said computerized environment model is further adapted to receive dynamic object information, and display a representation thereof.

10. The visual information display apparatus of claim 9 wherein said dynamic object information comprises radar obtained information.

11. The visual information display apparatus of claim 9 wherein said dynamic object information comprises sonar obtained information.

12. The visual information display apparatus of claim 9 wherein said dynamic object information is manually entered.

13. The visual information display apparatus of claim 9 wherein said dynamic object information are provided by an external information system.

14. A visual information display apparatus for displaying virtual reality scenes and augmented reality scenes, adapted to operate in conjunction with a computer and a display device, said apparatus comprising:
    a computerized image generator adapted to display a virtual representation of a computerized environment model or a portion thereof from a plurality of user selected viewpoints;
    an image integrator adapted to automatically merge a representation of at least a portion of said environment model with an actual observed scene input viewed from an observed scene viewpoint, when the user selected virtual viewpoint is within a predetermined proximity to the actual observed scene viewpoint.

15. The visual information display apparatus of claim 14, wherein said observed scene is inputted as see-through viewing.

16. The visual information display apparatus of claim 14 wherein said observed scene is inputted as video-through viewing.

17. The visual information system of claim 14, wherein light received from the observed scene is amplified.

18. The visual information display apparatus of claim 14, wherein the display is selected from a group consisting of a head mounted display, a television display, a computer display, a handheld display, a virtual display, a heads up display, an optical combiner display, a stereoscopic display, a monocular display, a binocular display, a selectively opaque display mounted in the user field of view, a retinal illumination display, projective display, or a combination hereof.

19. The visual information display apparatus of claim 14, further comprising a viewpoint selector operable to vary said user selected virtual viewpoint continuously.

20. The visual information display apparatus of claim 14 wherein said computerized environment model comprises cartographic data.

21. The visual information display apparatus of claim 14 wherein said computerized environment model comprises navigational data.

22. The visual information display apparatus of claim 14 wherein said computerized data environment model comprises pre-captured image data, or computer generated image data, or a combination thereof.

23. The visual information display apparatus of claim 14 wherein said computerized environment model or said image integrator, or a combination thereof, is further adapted to receive dynamic object information, and display a representation thereof.

24. The visual information display apparatus of claim 23 wherein said dynamic object information comprises radar obtained information.

25. The visual information display apparatus of claim 23 wherein said dynamic object information comprises sonar obtained information.

26. The visual information display apparatus of claim 23 wherein said dynamic object information is manually entered.

27. The visual information display apparatus of claim 22 wherein said dynamic object information is provided by an external information system.

28. The visual information display apparatus of claim 23 wherein said dynamic objects comprise information obtained using a sensor selected from a group consisting of magnetic sensor, beat sensor, infrared sensor, echo location sensor, radio location sensor, remote location reporting sensor, proximity sensor, or a combination thereof.

29. The visual information display apparatus of claim 14 further comprising a location sensor and an orientation sensor, forming an actual observed viewpoint sensor.

30. The visual information display apparatus of claim 29 wherein said actual observed viewpoint sensor or a portion thereof is mounted on a user head, and is responsive to said user head orientation and location.

31. The visual information display apparatus of claim 29 wherein said observable viewpoint sensor or a portion thereof is responsive to user eye movement.

32. A method for automatic switching between virtual reality scenes and augmented reality scenes, the method comprising the steps of:

displaying a virtual image representing a computerized environment model or a portion thereof on a display device;

selecting a virtual viewpoint, and modifying said virtual image in accordance with the selected virtual viewpoint;

sensing an actual observed scene from an actual observed viewpoint; comparing said selected virtual viewpoint and actual observed viewpoint;

merging at least a portion of said environment model virtual image with the actual observed scene, if the user selectable virtual viewpoint and the actual observed scene viewpoint are within a predetermined proximity to each other.

33. A method according to claim 32 further comprising the step of blocking the image of the actual observed scene when the selected virtual viewpoint and the actual observed scene viewpoint are in separated above a predetermined proximity.

34. A method according to claim 32 wherein said step of merging further comprise the step of moving the user selectable virtual viewpoint to the actual observed scene viewpoint.

35. A method according to claim 32 wherein said step of displaying further comprises displaying information regarding dynamic objects.

36. A method according to claim 35 wherein said information regarding dynamic objects is provided by an external information system.

37. A method according to claim 32 wherein said step of displaying further comprise the step of displaying dynamic objects, or representations thereof.

38. A visual information display apparatus for displaying virtual reality scenes and augmented reality scenes, adapted to operate in conjunction with a computer and a display device, said apparatus having:

an environment model for providing information about an environment;

selector means for selecting a selected virtual viewpoint;

image generator means for generating a computerized image from said environment model responsive to said selected virtual viewpoint;

visual input means for receiving an actual observed image, said visual input means having an actual viewpoint;

said apparatus characterized by:

controllable merging means, for selectively merging said observed image with said computerized image, for display on said display device;

a viewpoint comparator means for comparing said selected virtual viewpoint with said actual observed viewpoint, and controlling said merging means to switch between augmented reality and virtual reality responsive to the relationship between said viewpoints.

* * * * *